(12) United States Patent
Lorch

(10) Patent No.: US 6,279,831 B1
(45) Date of Patent: Aug. 28, 2001

(54) MIXING FITTING WITH SINGLE LEVER OPERATION

(75) Inventor: Werner Lorch, Schramberg (DE)

(73) Assignee: Hansgrohe AG (DE)

( * ) Notice: Subject to any disclaimer, the term of this patent is extended or adjusted under 35 U.S.C. 154(b) by 0 days.

(21) Appl. No.: 09/484,767

(22) Filed: Jan. 18, 2000

(51) Int. Cl.⁷ .................................................. G05D 23/13
(52) U.S. Cl. ...................................... 236/12.13; 236/12.2
(58) Field of Search .............................. 236/12.13, 12.2; 137/625.41

(56) References Cited

U.S. PATENT DOCUMENTS

| 4,286,749 | 9/1981 | Oguma ................................. 236/12 |
| 4,700,885 | * 10/1987 | Knebel ............................. 236/12.13 |
| 5,011,074 | * 4/1991 | Kline ................................. 236/12.13 |
| 5,551,630 | * 9/1996 | Enoki et al. ...................... 236/12.13 |

FOREIGN PATENT DOCUMENTS

| 28 03 663 | 8/1979 | (DE) . |
| 32 18 091 | 1/1983 | (DE) . |
| 31 28 968 | 2/1983 | (DE) . |
| 0 560 737 | 9/1993 | (EP) . |
| 0 775 954 A1 | 5/1997 | (EP) . |
| 2 424 459 | 11/1979 | (FR) . |
| WO 90/12351 | 10/1990 | (WO) . |

* cited by examiner

*Primary Examiner*—William E. Tapolcai
(74) *Attorney, Agent, or Firm*—Duane, Morris & Heckscher LLP

(57) ABSTRACT

A thermostatic valve contains a control system, which can be actuated by a single operating member. It produces a connection between a cold water inlet and a hot water inlet on the one hand and a mixed water outlet on the other. The control system can in particular have two control disks, whereof one is constructed as a fixed control disk and the other as a rotatable control disk in contact therewith. The control system is designed in such a way that on opening initially only cold water flows out of the outlet. This is achieved in that a direct connection is formed between the cold water inlet and the mixed water outlet. Only on further opening the valve is it ensured that the direct connection is closed, so that the cold water must then flow through the thermostatic valve.

9 Claims, 5 Drawing Sheets

MIXING FITTING WITH SINGLE LEVER OPERATION

Figure 1:
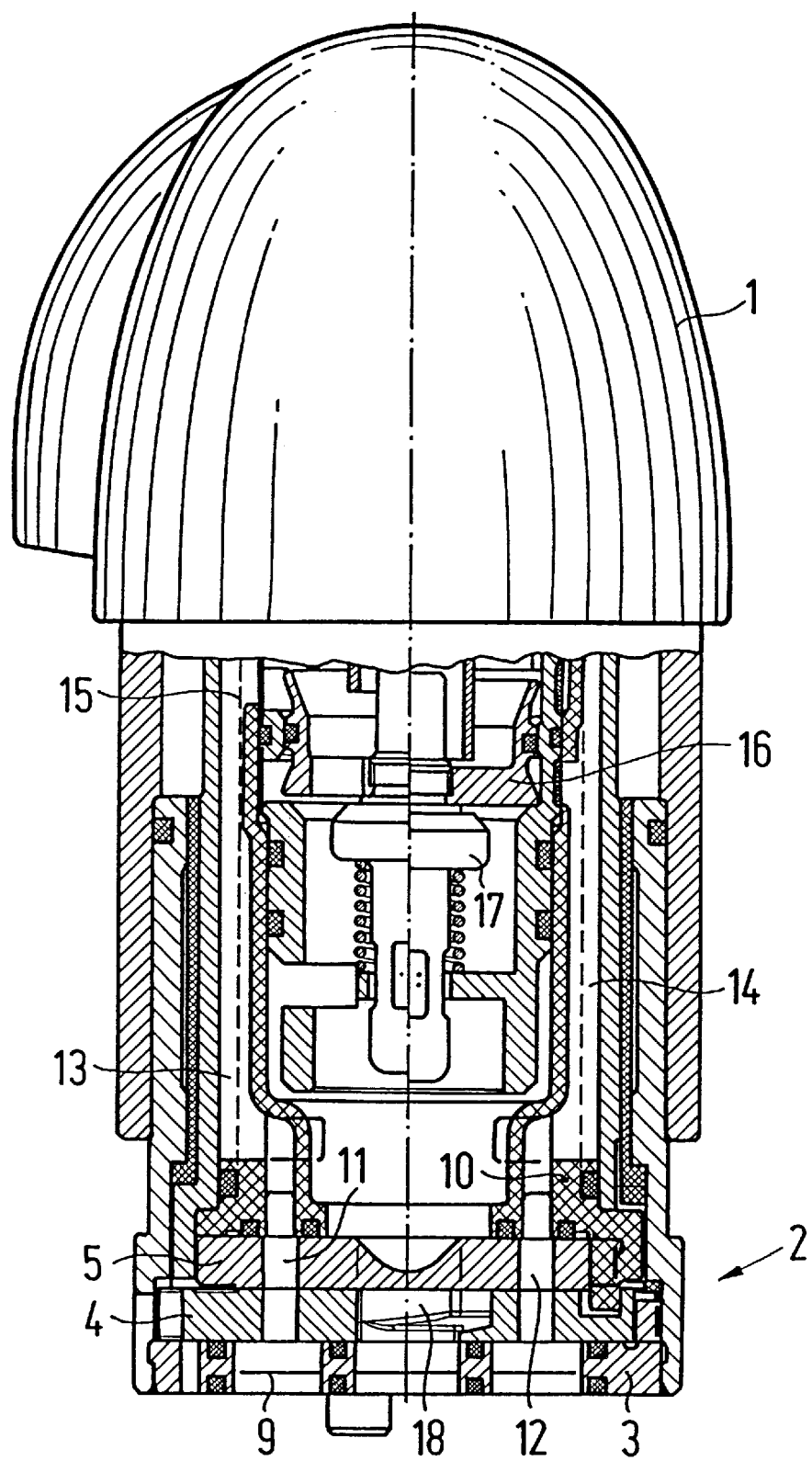

The invention is based on a thermostatic valve, in which with the aid of a first operating member it is possible to set a desired temperature, whilst the quantity of outflowing water can be determined with a second operating member. In a known valve of this type the temperature changes with the opening of the valve in such a way that when the valve is opened initially no cold water flows out.

The problem of the invention is to further improve a thermostatic valve.

According to the invention this problem is solved by a mixing fitting having the features of claim 1. Further developments of the invention form the subject matter of the dependent claims, whose wording, like that of the abstract, is by reference made into part of the content of the description.

If the valve proposed by the invention is opened with a single lever, initially and independently of the thermostat position, cold water flows out of the outlet, which protects against excessive temperatures and leads to an energy saving.

According to a further development of the invention, the control system is constructed in such a way that at the start of the opening movement the inlet for the cold water is opened before that for the hot water. This measure aids the behaviour of the valve.

According to a further development of the invention, the direct connection between the cold water inlet and the mixed water outlet is parallel to the connection via the thermostatic valve. As the flow resistance through the thermostatic valve in the case of a corresponding design of the direct connection can be made greater than the flow resistance through the latter, it is possible to ensure that at the start of opening the cold water exclusively flows through the direct connection to the outlet. As a result of the design of the direct connection it is also possible to ensure that there can be a continuous or flowing transition between the direct connection and the connection through the thermostatic valve.

The invention proposes that the control is optionally constructed in such a way that as the control system opening movement progresses the direct connection is closed again. It can in particular be provided that the direct connection is gradually closed and the connection via the thermostatic valve gradually opened.

The control system can in particular have control disks, e.g. a fixed control disk and a rotatable control disk and as a result of a more or less pronounced covering of openings in the control disks connections can be formed and closed.

According to the invention the direct connection can be provided by a lateral recess of the mixed water opening in the fixed control disk.

The prior opening of the inlet for the cold water can be brought about through an asymmetrical arrangement of the inlet opening in the fixed control disk.

Further features, details and advantages of the invention can be gathered from the following description of a preferred embodiment and the attached drawings, wherein show:

FIG. 1 An axial section through a mixing fitting according to the invention.

Figure 2:
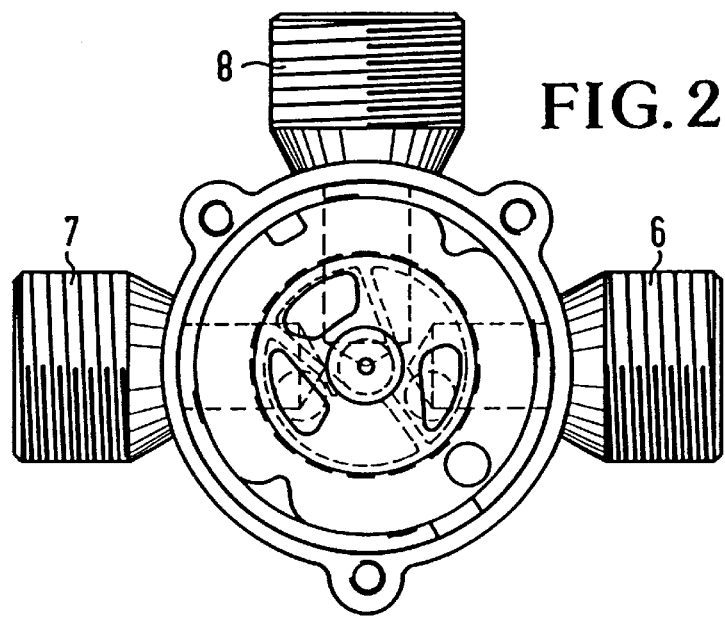

FIG. 2 A front view of the mixing fitting.

Figure 3:
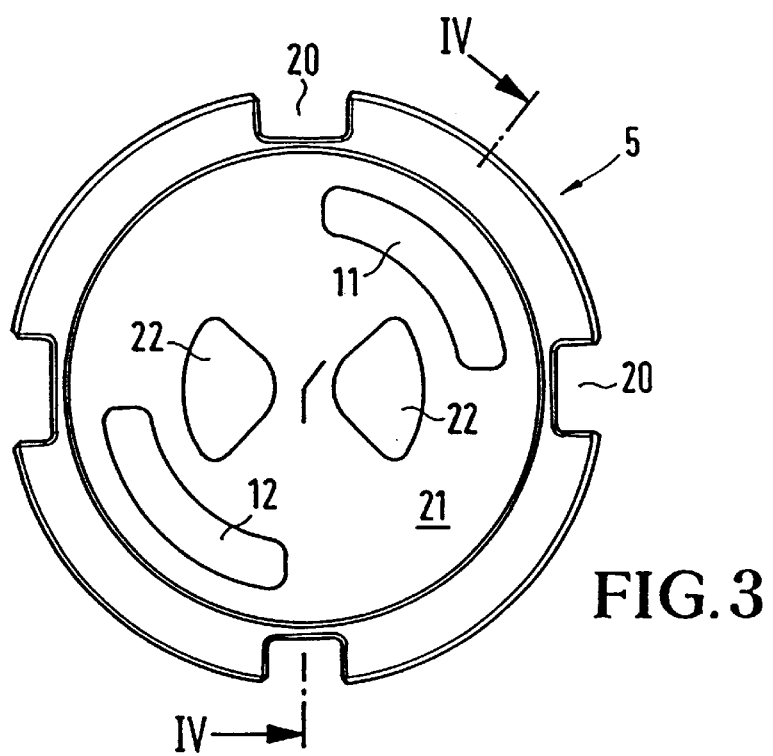

FIG. 3 A plan view of the movable control disk.

Figure 4:
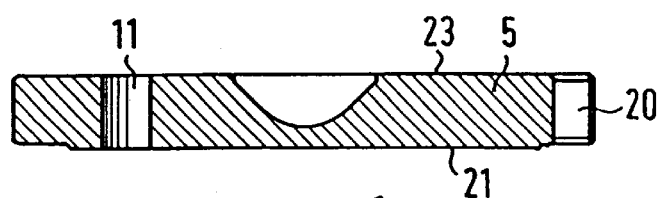

FIG. 4 A section through the movable control disk of FIG. 3.

Figure 5:
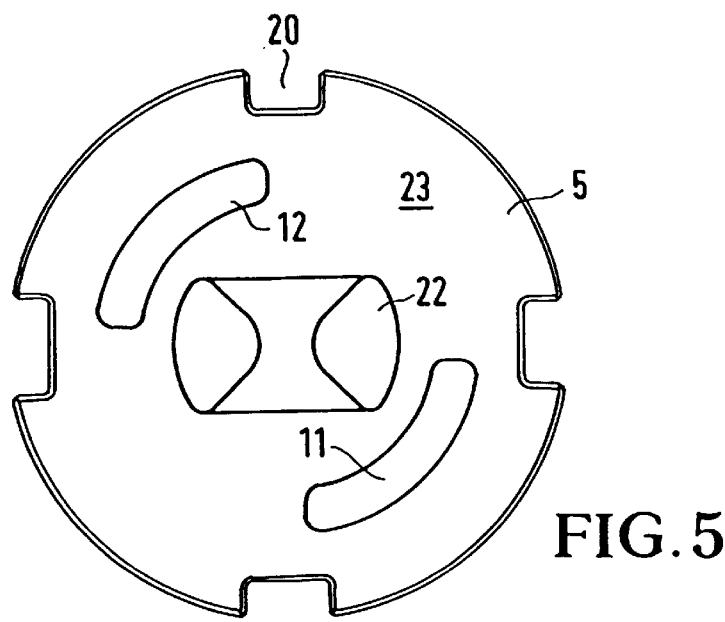

FIG. 5 A plan view of the movable control disk from the opposite direction.

Figure 6:
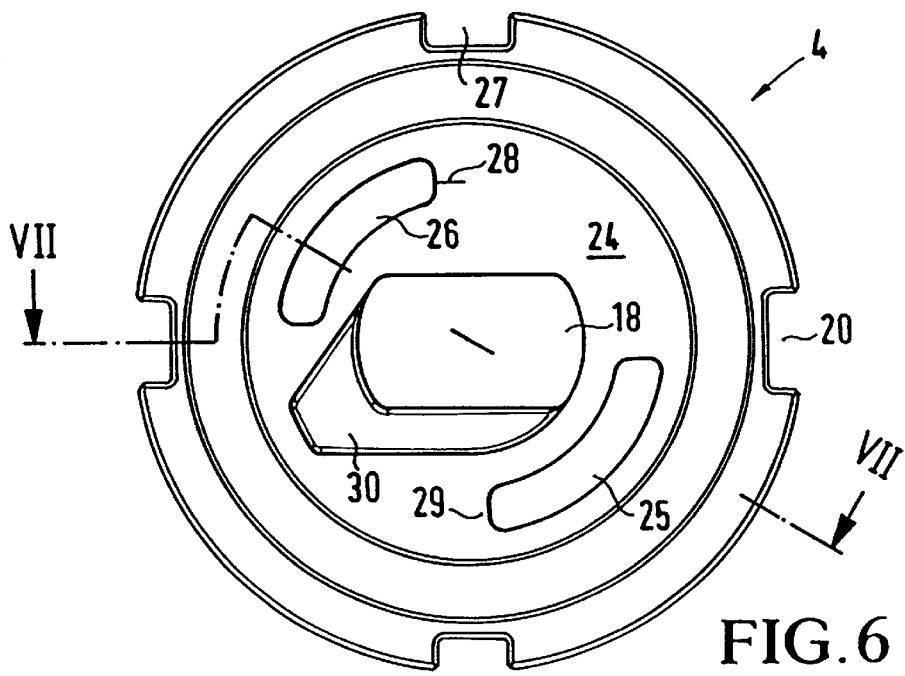

FIG. 6 A plan view of the fixed control disk from the direction of the movable control disk.

Figure 7:
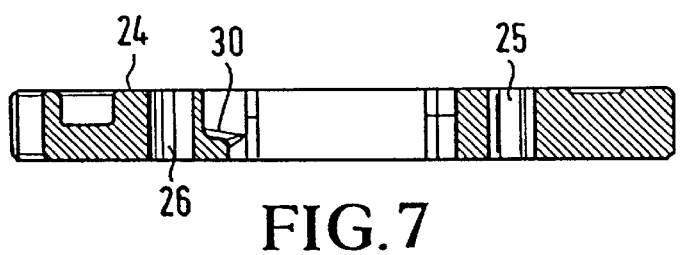

FIG. 7 A section through the fixed control disk of FIG. 6.

Figure 8:
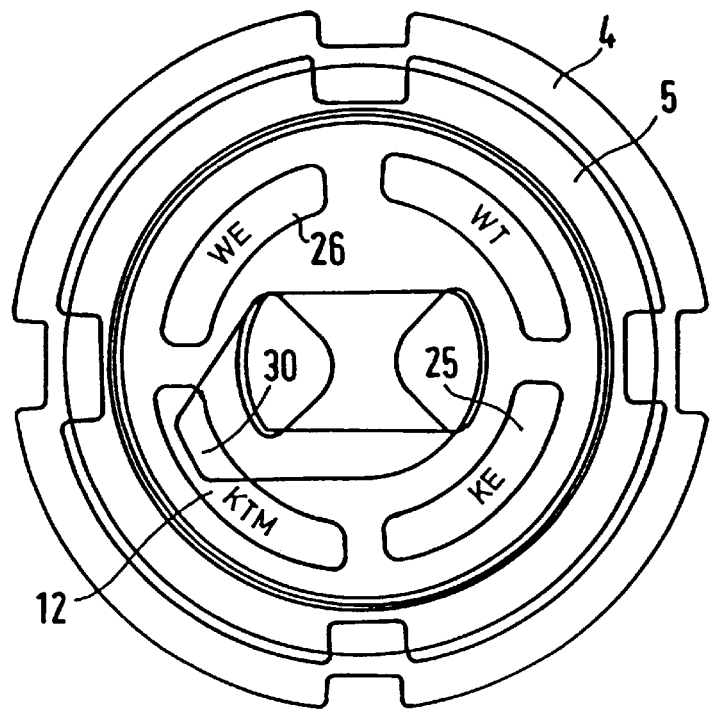

FIG. 8 Diagrammatically the mutual arrangement of the two control disks with the valve closed.

Figure 9:
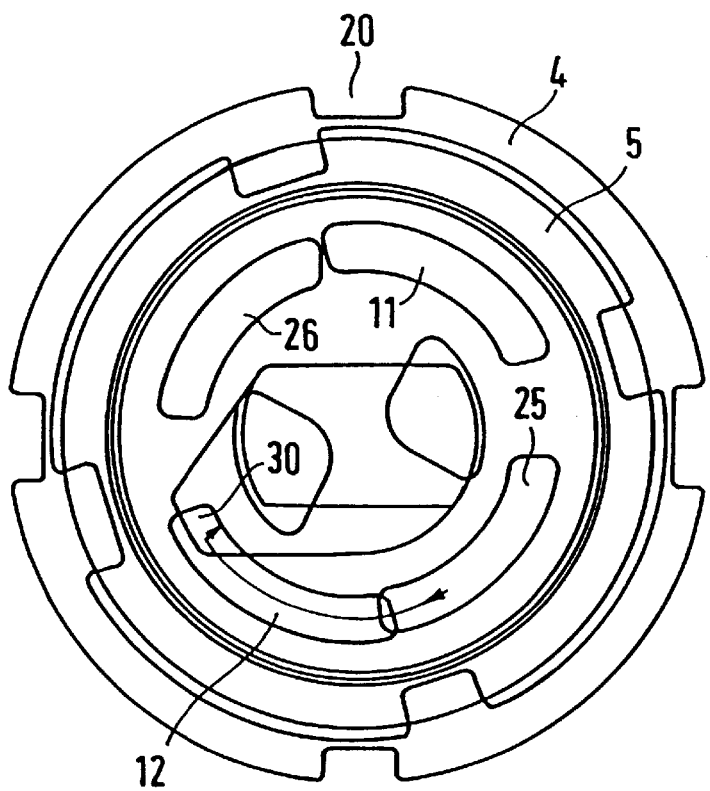

FIG. 9 A view corresponding to FIG. 8 at the start of the opening movement.

Figure 10:
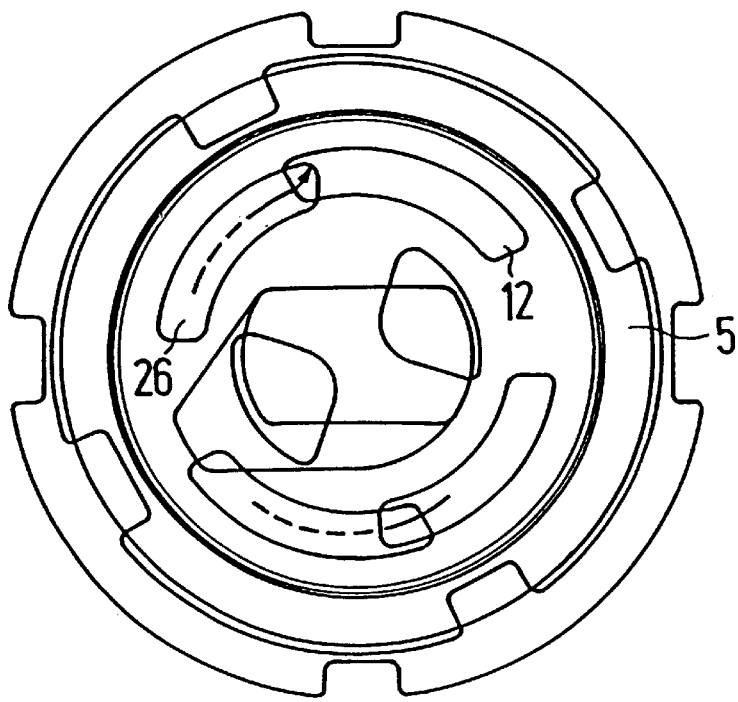

FIG. 10 A corresponding view when the opening movement has progressed.

Figure 11:
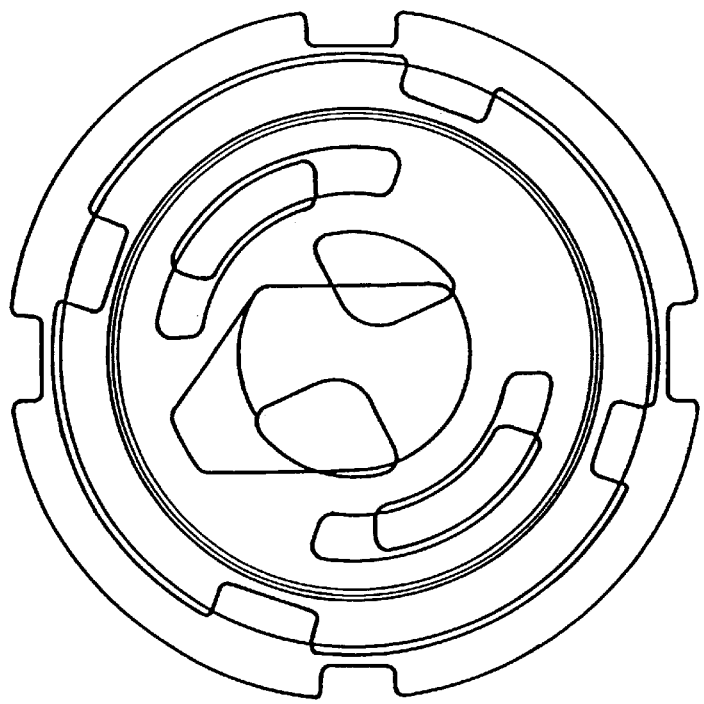

FIG. 11 A view with an almost completely opened valve.

FIG. 1 is an axial section through a thermostatic fitting, as proposed by the invention. The fitting contains a grip 1 with which it is possible to determine the quantity of the water flowing out of the fitting. The casing contains a control system 2, which is provided above the base 3 with a fixed control disk 4 and above the latter a rotatable control disk 5. The fitting is inserted in a body, which is shown in FIG. 2. The body contains a cold water connection 6, a hot water connection 7 and a mixed water connection 8. The connections are linked with the cartridge base 3. The cartridge base 3 has three openings 9, which are linked with the corresponding connections. By rotating the grip 1 the movable control disk 5 is rotated with the aid of the distributor 10. The movable control disk 5 contains a cold water opening 11 and a hot water opening 12. The two openings 11, 12 lead via corresponding channels 13, 14 to the two slot-like inlets 15 of the thermostatic valve 16. The thermostatic valve 16 contains an expansion body 17 controlled by the mixed water and which regulates the position of the thermostatic valve 16. The mixed water is passed centrally through the distributor 10 and leaves the latter through a mixed water opening of the movable control disk 5. From the mixed water opening of the movable control disk 5 the mixed water passes into the mixed water opening 18 of the fixed control disk 4 and from there to the mixed water outlet 8. On rotating the movable control disk 5 with the aid of the distributor 10 the desired temperature of the thermostat 16 is simultaneously modified.

Details of the control are shown in the following drawings. Reference is firstly made to FIGS. 3 to 5 showing the movable control disk 5. FIG. 3 is a view of the movable control disk from below in FIG. 1, so that it is possible to see the surface resting on the fixed control disk 4. On its circumference the control disk 5 has four notches 20 with different widths. The notches 20 serve on the one hand for moving the control disk 5 during the rotation of the grip 1 and also for ensuring the correct position of the control disk in the distributor 10.

The cold and hot water openings 11, 12 are constructed as arcuate slots, which extend over somewhat less than a quadrant. The arrangement of the two openings 11, 12 is centrosymmetric with respect to the centre of the control disk 5.

In the represented face 21 issue two openings 22, which on the facing, upper face 23 of the control disk visible in FIG. 5 pass into a single opening. The openings 22 represent the mixed water outlet from the thermostatic valve 16. The control disk 5 is fixed to the distributor 10 in such a way that the openings 11, 12 are connected to the inlet openings 15 of the thermostatic valve, whilst the outlet from the thermostatic valve 16 is connected to the openings 22.

FIG. 4 shows an angular section roughly along line IV—IV in FIG. 3. The control face 21 is at the bottom, so that the openings 22 are not visible as a through opening. The fixed control disk belonging to said control disk is shown in FIGS. 6 and 7. The fixed control disk has a certain similarity to the movable control disk 5. It contains on its circumference four notches 20 of differing width, which ensure the correct insertion of the control disk. FIG. 6 is a view of the control disk from above in FIG. 1, i.e. the visible face 24 is the face which is connected with the face 21 of the movable control disk 5 shown in FIG. 3. The fixed control disk contains an inlet opening 25 for cold water and a diametrically positioned inlet opening 26 for hot water. Both openings 25, 26 are constructed as arcuate slots, which extend over somewhat less than a quadrant. However, in this case the arrangement is not centrosymmetric to the centre. The hot water opening 26 has a distance 28 from the diameter line 27 passing through the centre which is greater than the corresponding distance 29 of the cold water opening 25.

The shape of the outlet opening 18 for the mixed water initially roughly corresponds to the shape of the opening 22 visible in FIG. 5. However, the opening contains a lateral recess 30, which extends from a corner of the oval opening 18 in a radially outward direction. This recess is also visible in the section of FIG. 7, which is an angular section roughly along line VII—VII in FIG. 6. Here the control face 24 is at the top, corresponding to FIG. 1.

FIGS. 8 to 11 show the operation of the fitting proposed by the invention. As already mentioned in connection with FIG. 1, the water passes through the openings 9 of the cartridge base 3 to the fixed control disk and from there, as a function of the movable control disk, can flow to the openings of the thermostatic valve and/or the outlet opening. FIG. 8 shows the mutual position of the two control disks when the valve is closed. The cold water inlet opening 26 and hot water inlet opening 27 are completely closed by the control face 21 of the movable control disk 5. The lateral recess 30 of the fixed control disk 4 is linked with the cold water opening of the movable control disk 5, but this produces no effect because no water can pass into the valve.

The position of the movable control disk 5 in FIG. 8 is fixed as the closed position by a stop member of the fitting. An opening of the valve is only possible in one direction, namely in that the movable control disk 5 is rotated counterclockwise in FIG. 8. This position is shown in FIG. 9 where, as is apparent from the position of the notches, there has been a rotation of roughly 15. In this position the inlet opening 25 is of the fixed control disk is now linked with the somewhat turned inlet opening 12 of the movable control disk 5, because the two openings overlap somewhat. Thus, the cold water can flow out of the fixed control disk into the movable control disk 5 and from there to the thermostatic valve 16. However, in this position the cold water opening 12 of the movable control disk is still linked with the lateral recess 30 of the mixed water opening, so that the cold water can flow directly to the outlet.

As the hot water opening 26 is displaced in the fixed control disk, cf. FIG. 6, there is still no connection between the hot water inlet 26 and the hot water inlet 11 for the thermostatic valve. Only on further rotating the movable control disk 5, cf. FIG. 10, can hot water also flow from the opening 26, through the opening 12 to the thermostatic valve. In this position the direct connection for the cold water is almost closed. On further rotating the movable control disk into the position shown in FIG. 11 the direct connection is completely closed, so that the cold water must also flow completely through the thermostatic valve 16.

What is claimed is:

1. Mixing fitting with single lever operation, comprising a cold water inlet, a hot water inlet, a thermostatic valve, a mixed water outlet and a control system for the connection of inlets and outlets via the thermostatic valve, wherein the control system has a position in which both a direct connection is formed between the cold water inlet and the mixed water outlet and an indirect connection is formed between the cold water inlet and the mixed water outlet via the thermostatic valve.

2. Mixing fitting according to claim 1, wherein the control system is constructed in such a way that at the start of the opening movement the cold water inlet is opened before the hot water inlet.

3. Mixing fitting according to claim 1, wherein the direct connection is parallel to the connection through the thermostatic valve.

4. Mixing fitting according to claim 1, wherein the control system is constructed in such a way that as the opening movement progresses the direct connection is closed again.

5. Mixing fitting according to claim 1, wherein the control system includes a fixed control disk and a movable control disk.

6. Mixing fitting according to claim 5, wherein the direct connection is brought about by a lateral recess of the mixed water opening in the fixed control disk.

7. Mixing fitting according to claim 2, wherein the prior opening of the cold water inlet is brought about through an asymmetrical arrangement of the inlet openings in the fixed control disk.

8. Mixing fitting according to claim 5, wherein the control disks are planar control disks.

9. Mixing fitting of claim 1 wherein the control system has a position in which no flow of cold water or hot water occurs.

\* \* \* \* \*